TESTING AND MEASURING CIRCUIT

Original Filed Sept. 15, 1955

INVENTOR:
MAX H. DIEHL,
BY Julius J. Zaskalicky
HIS ATTORNEY.

United States Patent Office 2,986,700

Patented May 30, 1961

2,986,700

TESTING AND MEASURING CIRCUIT

Max H. Diehl, Syracuse, N.Y., assignor to General Electric Company, a corporation of New York Continuation of application Ser. No. 534,507, Sept. 15, 1955. This application Apr. 23, 1958, Ser. No. 730,403

2 Claims. (Cl. 324—85)

The present invention relates to measuring and testing circuits and in particular relates to circuits for aligning the quadrature phase of the color sub-carrier wave in a color television system.

The present application is a continuation of copending application Serial Number 534,507, filed September 15, 1955, for "Testing and Measuring Circuit," and now abandoned.

In present day color television systems, color information is conveyed on a color sub-carrier wave, the amplitude of which represents the color saturation and the phase of which, with respect to the color sub-carrier burst of reference phase, determines the hue of the color. The color sub-carrier wave is made up of two components, an in-phase or I component and a quadrature-phase or Q component. The in-phase or the quadrature phase terminology has reference to the phase of the sub-carrier burst. To obtain proper color rendition in color television systems, it is essential that the I component be in phase quadrature with respect to the Q component.

Applicant's invention is directed to the provision of simple and effective means for effecting such an alignment.

Another object of the present invention is to provide improvements in aligning means for color television systems.

It is also an object of the present invention to provide improvements in electronic testing circuits.

In an illustrative embodiment for carrying into effect applicant's invention, there is provided means for developing second harmonic voltages from each of a pair of voltages of sub-carrier frequency. The second harmonic voltages are combined to produce an output. Means are further provided for adjusting the phase of one of said carrier waves until said output is a minimum. When such a condition exists, the fundamental components are in quadrature phase.

Figure 1:
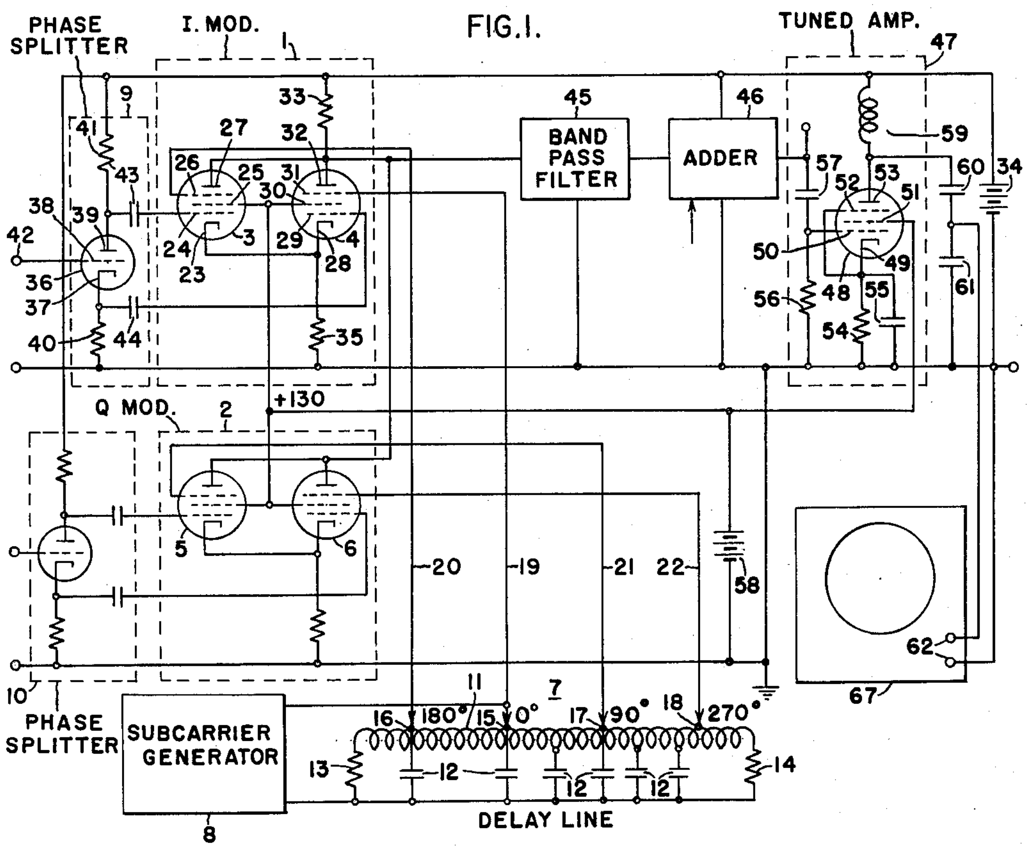
Figure 2:
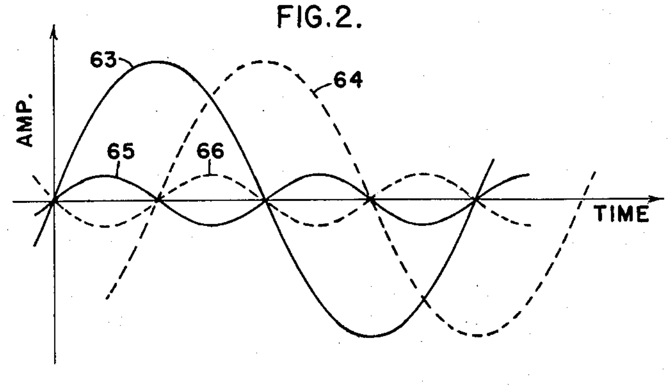

The novel features which I consider to be characteristic of my invention are set forth with particularity in the appended claims. The invention itself, however, both as to its organization and method of operation together with further objects and advantages thereof may be best understood by reference to the following description taken in connection with the accompanying drawings in which:

Figure 1 is a schematic diagram of a circuit for carrying out the present invention; and Figure 2 is a graph of the fundamental and second harmonic components of a pair of waves for illustrating the principle of applicant's invention.

Referring now to Figure 1 of the drawing, there is shown a portion of the circuit that would be included in the transmitting portion of a color television system and which functions to develop a pair of sub-carrier waves in phase quadrature with respect to one another, one being modulated by the I color component from the television color camera and the other modulated by the Q color component from the television color camera. These functions are effected by the I modulator comprising electron discharge devices 3 and 4 and the Q modulator comprising electron discharge devices 5 and 6. To the I and Q modulators are applied sub-carrier voltages of proper phase developed from the delay line 7 which is in turn excited by the sub-carrier generator 8.

The sub-carrier generator 8 may include any of a variety of oscillator generators, including crystal oscillators, for developing a wave of sub-carrier frequency, which according to present-day standards is 3.58 megacycles. The output of the sub-carrier generator is applied to point 15 on the delay line 7 which is schematically shown as consisting of an inductive element 11 and a series of capacitive elements 12 distributed along the length of the inductive element 11. The ends of the delay line are terminated by respective terminating resistances 13 and 14 which function to minimize reflections from the lines. Intermediate point 15 on delay line 7 will be denoted as the "zero" phase of the delay line. The phase of the voltage appearing at this point is arranged to be in phase with the color reference burst or in some fixed relationship with respect to it. Point 16 on the delay line is arranged to have a 180° delay with respect to the voltage at point 15 at the sub-carrier frequency and similarly points 17 and 18 are arranged to have 90° and 270° delays, respectively. Conductors 19, 20, 21 and 22 are connected to points 15, 16, 17 and 18, respectively, and for the purpose of adjustment and convenience, these connections are shown as variable.

The I modulator 1 comprises electron discharge devices 3 and 4. Device 3 includes a cathode 23, a grid 24, a screen grid 25, a suppressor grid 26 and a plate 27. Device 4 includes a cathode 28, a grid 29, a screen grid 30, a suppressor grid 31 and an anode 32. The anodes 27 and 32 are connected together and through anode load resistance 33 to the positive terminal of source of unidirectional supply potential 34. Cathodes 23 and 28 are connected together and through cathode load resistance 35 to the negative terminal of source 34. Grid 26 is connected over conductor 20 to point 16 on delay line. Grid 31 is connected over conductor 19 to point 15 on delay line 7. Screen grids 25 and 31 are connected together and to the positive terminal of source 58, the negative terminal of which is connected to ground. The phase splitter 9 comprises electron discharge device 36, including a cathode 37, a control grid 38 and an anode 39. The cathode 37 is connected through cathode load resistance 40 to the negative terminal of source 34. The anode 39 is connected through anode load resistance 41 to the positive terminal of source 34. The grid 38 is connected to terminal 42 to which is applied the modulating component of the color signal. The anode 39 is coupled through coupling capacitor 43 to the grid 24. Cathode 37 is coupled through coupling capacitor 44 to the grid 29.

It should be noted that sub-carrier wave and the modulating video signal are applied to the devices 3 and 4 in push-pull relationship. Accordingly, neither carrier wave nor the modulating video wave appear in the output of the modulator. However, the modulation products corresponding to side band components of the modulated wave do appear in the output across load resistance 33. Balanced modulators of the kind described are well-known in the art.

The Q modulator 2 and the phase splitter 10 are similar to the I modulator 1 and the phase splitter 9 and will not be described in detail and their functions are identical thereto except that the sub-carrier waves, applied to the Q modulator over conductors 21 and 22, are 90° out of phase with respect to the sub-carrier waves applied to the I modulator over conductors 19 and 20, respectively. The Q component of video signal is applied at the input terminals of the phase splitter 10. The anodes of the devices 5 and 6 are connected together with the anodes 27 and 32 of the I modulator. Thus, across the anode 33 is obtained I and Q sub-carrier components of the color television signal.

It will be apparent that the I and Q modulators are not perfect and include non-linearities which give rise to harmonic components of voltage. Accordingly, across the load resistance 33 are obtained second harmonic voltages of the carrier voltages applied to these modulators. Conventionally, the output from the balanced modulators are applied in commonly used systems to a band-pass filter 45 which restricts the side band components to those occuring in the 2 to 5 magacycle range. This band-pass filter may take the form of an inductance-capacitance filter circuit having the desired band-pass characteristic. The I and Q sub-carrier components obtained from the band-pass filter are then combined in the adder stage 46 with the luminance component of the television signal, the synchronizing signal and the color burst. The output from the adder 46 in conventional systems is applied to the television transmitter. At this point, applicant has provided a tuned amplifier 47 to which is also applied the output from the adder 46, tuned to eliminate all waves except those in the vicinity of twice the sub-carrier frequency, that is, those frequencies in the vicinity of 7.2 magacycles.

The tuned amplifier 47 comprises an electron discharge device 48, including a cathode 49, a grid 50, a screen grid 51, a suppressor grid 52 and an anode 53. The cathode is connected through cathode load resistance 54, bypassed by capacitance 55 to the negative terminal of source 34. The grid is connected through grid lead resistance 56 to ground and through coupling capacitor 57 to the output of adder 46. The screen grid is connected to the positive terminal of source 58. Suppressor grid 52 is connected to the cathode 49. The anode 53 is connected through parallel resonant circuit 59 to the positive terminal of source 34. The resonant circuit 59 is tuned to pass substantially only those waves having frequencies in the vicinity of 7.2 megacycles, approximately twice the sub-carrier frequency. Between anode 53 and ground, a pair of capacitances 60 and 61 are connected in series. The junction of these capacitances is connected to the input terminal 62 of oscilloscope 67, the other terminal of the oscilloscope being connected to ground. Applicant's tuned amplifier 47 may just as conveniently have been connected to the output of the I and Q modulator directly.

The operation of applicant's invention will be more fully appreciated by considering Figure 2 wherein there is shown a graph of voltages plotted on amplitude versus time scale. The graph 63 represents the voltage appearing between points 15 and 16 and is the voltage applied to the I modulator. The graph 64 represents the voltage appearing between terminals 17 and 18 and is the voltage applied to the Q modulator. The graph 65 is the component of second harmonic voltage developed at the output of the I modulator. This second harmonic component is in phase with the fundamental component 63. Similarly, the graph 66 represents the second harmonic component of voltage developed at the output of the Q modulator and similarly, it is in phase with the fundamental component 63. It will be understood that the second harmonic components of the voltage have been shown of much larger amplitude with a reference to the fundamental component than would normally be the case. This has been done for the purpose of clarity and emphasis. From Figure 2, it is apparent that when waves 63 and 64 are in phase quadrature, second harmonic components 65 and 66 are out of phase and cancel one another. In accordance with applicant's invention, the oscilloscope 67 is adjusted to have a sweep suitable for obtaining an indication of the amplitude response of the signal applied to its input terminals, then phase of the wave appearing on conductors 21 and 22 is adjusted with respect to the phase of the wave appearing between points 15 and 16 until a minimal indication is obtained on the oscilloscope, at which time the wave applied to the I modulator will be in phase quadrature with respect to the wave applied to the Q modulator as will be apparent from Figure 2.

While a particular embodiment of my invention has been shown and described, it is apparent that changes and modifications may be made without departing from the invention in its broader aspects and, therefore, the aim in the appended claims is to cover all such changes and modifications which fall within the true spirit and scope of my invention.

What is claimed is:

1. In a circuit including a balanced modulator to which are applied a pair of carrier voltages in quadrature phased relationship and from which is inherently obtained a small amount of second harmonics of the applied carrier voltages, means for determining whether the phases of said carrier voltages are in phase quadrature comprising a single tuned amplifier selectively responsive to and amplifying said second harmonics of the applied carrier voltages and oscilloscope means for visually indicating the phase of one of said carrier waves with respect to the other to determine whether a substantially straight line is presented to indicate maximum cancellation of opposing second harmonic voltages and therefore exact phase quadrature of said carrier voltages with respect to each other.

2. Apparatus for determining when a pair of carriers at the same frequency but desired in quadrature phase relationship with each other are in such quadrature phase relationship comprising an amplifier, said amplifier having an anode and a control electrode, means to couple the signals to said control electrode, a tuned circuit resonant to the second harmonics of the signals, a first and a second capacitor in series disposed between said tuned circuit at the end opposite the anode connected end and ground, an oscilloscope, a lead connected between the junction of said capacitors and the input of said oscilloscope, said amplifier and associated circuit forming a tuned amplifier, whereby when a straight line is presented on said oscilloscope this will indicate maximum cancellation of opposing second harmonic voltages and therefore phase quadrature of said carrier voltages.

References Cited in the file of this patent

UNITED STATES PATENTS

| | | |
|---|---|---|
| 2,209,064 | Nyquist | July 23, 1940 |
| 2,333,322 | Levy | Nov. 2, 1943 |
| 2,455,646 | Beard et al. | Dec. 7, 1948 |
| 2,476,977 | Hansel | July 26, 1949 |
| 2,522,369 | Guanella | Sept. 12, 1950 |
| 2,580,803 | Logan | Jan. 1, 1952 |
| 2,659,050 | Honey | Nov. 10, 1953 |
| 2,695,399 | Martin | Nov. 23, 1954 |
| 2,713,661 | Schmitt | July 19, 1955 |
| 2,902,650 | Kaiser | Sept. 1, 1959 |

OTHER REFERENCES

"Use of the Vectorscope Technique to Service Color TV," article in Electronic Technician, pages 34–37, August 1957.